US006720064B2

(12) United States Patent
Goto

(10) Patent No.: US 6,720,064 B2
(45) Date of Patent: Apr. 13, 2004

(54) IMAGE-RECEIVING SHEET FOR ELECTROPHOTOGRAPHY

(75) Inventor: Yasutomo Goto, Shizuoka-Ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 43 days.

(21) Appl. No.: 10/173,104

(22) Filed: Jun. 18, 2002

(65) Prior Publication Data

US 2003/0044625 A1 Mar. 6, 2003

(30) Foreign Application Priority Data

Jun. 22, 2001 (JP) ....................................... 2001-189111

(51) Int. Cl.[7] .............................. B32B 7/00; B32B 7/02; B32B 27/36; B32B 3/00

(52) U.S. Cl. ........................ 428/212; 428/195; 428/480; 399/320; 399/324; 399/328

(58) Field of Search ................................ 428/212, 480, 428/195; 399/320, 324, 328

(56) References Cited

U.S. PATENT DOCUMENTS

| | | | | | |
|---|---|---|---|---|---|
| 6,057,070 | A | * | 5/2000 | Ogura | 430/47 |
| 6,233,424 | B1 | * | 5/2001 | Mohri et al. | 399/320 |
| 6,312,788 | B1 | * | 11/2001 | Mohri et al. | 428/195.1 |
| 2003/0186061 | A1 | * | 10/2003 | Murata et al. | 428/421 |

* cited by examiner

*Primary Examiner*—Vivian Chen
(74) *Attorney, Agent, or Firm*—Young & Thompson

(57) ABSTRACT

An image-receiving sheet for electrophotography having improved gloss is provided, which sheet is capable of preventing reverse transferring of a toner image to the fixing part, i.e., offset. The image-receiving sheet is capable of improving peeling of the image-receiving sheet and the fixing part from each other to provide stable paper feeding ability and a stable image. The image-receiving sheet comprises a toner image-receiving layer containing a polymer, wherein relationship between a surface tension of said polymer ($\gamma_p$)(mN/m) determined at a toner fixing temperature and a surface tension of a toner ($\gamma_t$)(mN/m) determined at said toner fixing temperature meets the following formula; $\gamma_p-\gamma_t \geqq 8$.

6 Claims, 1 Drawing Sheet

IMAGE-RECEIVING SHEET FOR ELECTROPHOTOGRAPHY

BACKGROUND OF THE INVENTION

The present invention relates to an image-receiving sheet for electrophotography. Further, the present invention relate to an image-receiving sheet suited for use in an electrophotographic device having a fixing belt.

An electrophotographic method is employed for an output device for a copying machine and a personal computer because in this method a dry treatment is employed, and thus the printing speed is high. The electrophotographic method is accomplished by transferring a toner image to an image-receiving sheet, and then passing the sheet through a heated and/or pressed fixing part, such as a fixing roller or a fixing belt, to fix the toner image to the image-receiving sheet. General paper (plain paper and quality paper) is usable as the image-receiving sheet. However, for improving the fineness, glossiness and brightness of the image, using an image-receiving sheet for electrophotography which comprise a toner image-receiving layer containing a thermoplastic resin formed on a support is proposed in J. P. KOKAI Nos. Hei 4-212,168 and 8-211,645.

However, in the electrophotographic image-receiving sheet comprising a toner image-receiving layer containing a thermoplastic resin, the fixing of the toner image onto the toner image-receiving layer is poor. Therefore, the sheet has a problem in that reverse transferring of a toner image onto said fixing part, a so-called offsetting, occurs. Furthermore, if an offset occurs, the sheet has another problem in that a portion of the image is peeled off of the image-receiving layer to be transferred onto the fixing part, thus causing deterioration of the image, and thereby decreasing the gloss. Also, due to poor peeling of the image-receiving sheet from the fixing part, it is possible that the image-receiving sheet will be adhered to the fixing part, and thus cause paper jamming and system damage.

To solve these problems, in J.P. KOKAI No. 4-501925 a method for processing an image comprising a fixing belt type fixing part using a ferro-type web having a specific surface energy has been proposed. Also, in J.P. KOKAI No. 10-230889 an image-receiving sheet having an image-receiving layer with a specific elastic modulus has been proposed.

However, said problems with regard to offset, gloss and peeling are caused by the image-receiving sheet adhering to the fixing belt, or the image-receiving sheet adhering the toner image. These problems are inevitable even if the properties of the fixing belt and the image-receiving sheet themselves are specifically determined. Therefore, it is necessary to determine a desirable range regarding the relationships of properties between an image-receiving sheet and a toner image, as well as an image-receiving sheet and a fixing part.

SUMMARY OF THE INVENTION

Figure 1:
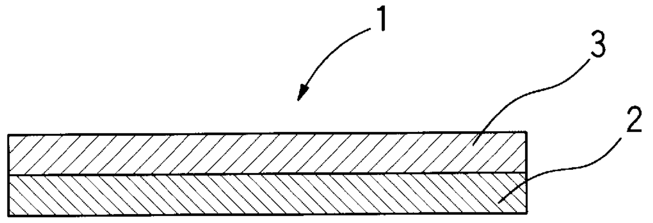
FIG. 1 is a schematic diagram showing an image-receiving sheet for electrophotography of the present invention, wherein 1 represents an image-receiving sheet, 2 represents a support, and 3 represents a toner image receiving layer.

Therefore, the first object of the present invention is to provide an image-receiving sheet in which the fixing of a toner image onto a toner image-receiving layer is improved, and reverse transferring of a toner image onto a fixing part is prevented, and in which no offsetting occurs and there is an excellent gloss.

The second object of the present invention is to provide an image-receiving sheet in which transferring of the image as well as the image-receiving sheet onto the fixing part due to peeling is prevented, and as the result of which, a stable paper feeding ability and stable image are provided.

After intensive investigations made for the purpose of solving the above-described problems, the inventor has found that the above-described problems can be solved by providing an image-receiving material for electrophotography, which meets the following conditions.

Namely, the first aspect of the present invention relates to an image-receiving sheet for electrophotography, which comprises a toner image-receiving layer containing a polymer, wherein a relationship between surface tension of said polymer ($\gamma_p$)(mN/m) determined at a toner fixing temperature and surface tension of a toner ($\gamma_t$)(mN/m) determined at said toner fixing temperature meets the following formula (I);

$$\gamma_p - \gamma_t \geqq 8 \quad \text{(I)}$$

The second aspect of the present invention relates to an image-receiving sheet for electrophotography, which comprises a toner image-receiving layer, wherein said image-receiving sheet for electrophotography is used for an electrophotographic device having a fixing belt, and wherein a contact angle determined by a melted toner at a toner fixing temperature and the surface of said toner image-receiving layer ($\theta_1$) (°) and a contact angle determined by said melted toner at said toner fixing temperature and the surface of said fixing belt ($\theta_2$) (°) meet the following formula (II);

$$\theta_2 - \theta_1 \geqq 10 \quad \text{(II)}$$

The third aspect of the present invention relates to an image-receiving sheet for electrophotography, which comprises a toner image-receiving layer, wherein said image-receiving sheet for electrophotography is used for an electrophotographic device having a fixing belt, and wherein surface free energy of the surface of said toner image-receiving layer ($G_1$) (mN/m) and surface free energy of the surface of said fixing belt ($G_2$) (mN/m) meet the following formula (III);

$$G_1 - G_2 \geqq 10 \quad \text{(III)}$$

The fourth aspect of the present invention relates to an image-receiving sheet for electrophotography, which comprises a toner image-receiving layer, wherein said image-receiving sheet for electrophotography is used for an electrophotographic device having a fixing belt, and wherein a polar component of surface free energy of the surface of said toner image-receiving layer ($g^P{}_1$) (mN/m) and a polar component of surface free energy of the surface of said fixing belt ($g^P{}_2$) (mN/m) meet the following formula (IV);

$$g^P{}_1 - g^P{}_2 \geqq 0.3 \quad \text{(IV)}$$

DESCRIPTION OF THE PREFERRED EMBODIMENTS

A detailed explanation of the present invention is given below.

(1) Image-Receiving Sheet for Electrophotography

The image-receiving sheet for electrophotography of the present invention comprises a toner image-receiving layer containing a polymer on a support. For example, as shown in FIG. 1, the image-receiving sheet for electrophotography (1) comprises a toner image-receiving layer (3) on a support (2).

(1-1) Support

The support usable for forming a photographic image-receiving sheet of the present invention is not particularly limited as long as it is resistant to the fixing temperature and it satisfies the requirements such as smoothness, whiteness, slipping, peeling, antistatic property and denting after the fixing of the image. The support used in the present invention is, for example, a base layer such as a raw paper (including a synthetic paper), a synthetic resin film or sheet, a cloth, a metal and a glass; or a laminate containing a combination of the base layer with a laminate layer and an undercoating layer.

A material for the raw paper can be selected from among various materials used for forming known raw papers without any particular limitation. Examples of such materials are a natural pulps selected from those of conifer and broadleaf trees; synthetic pulps made of plastic materials such as polyolefin and polystyrene; and mixtures of the natural pulps and the synthetic pulps. The synthetic resin film or sheet includes, for example, various plastic films or sheets such as polyolefins, polyvinyl chloride, polyethylene terephthalate, polystyrene methacrylate, polyethylene naphthalate, polycarbonate polyvinyl chloride, polystyrene, polypropylene, polyimide and celluloses (e.g., triacetylcellulose).

The base layer may be the above-mentioned raw paper alone or a laminate selected from among the above-mentioned raw papers.

The basis weight of the base layer is in the range of, for example, 50 to 250 g/m$^2$, preferably 100 to 180 g/m$^2$. The thickness of the base layer is in the range of, for example, 50 to 250 $\mu$m, preferably 100 to 180 $\mu$m. Preferred examples of the base layer include papers described in, for example "Shashin Kogaku no Kiso (Fundamentals of Photographic Engineering)—Gin'en Shashin-Hen (Silver salt Photos Edition)—" (edited by Nippon Shashin Gakkai and published by Corona Co., Ltd. in 1979), pages 223 to 240.

The support may be a laminate containing a combination of the above-mentioned base layer with a laminate layer, an undercoating layer or the like.

As the laminate layer various resins, rubber latex and polymer material may be used. Specific example of the materials useable for the lamination include polyolefins, polyvinyl chloride, polyethylene terephthalate, polystyrene, polymethacrylates, polyethylene terephthalate, polycarbonates, polypropylene, polyimides and triacetylcellulose. Generally, a low-density polyethylene is used as the polyolefin. However, for improving the thermal resistance of the support, it is preferred to use polypropylene, a blend of polypropylene and polyethylene, a high-density polyethylene, or a blend of the high-density polyethylene and a low-density polyethylene. From the viewpoint of cost and its suitableness for the laminate, it is preferred to use the blend of the high-density polyethylene and the low-density polyethylene in a blend ratio (a mass ratio) of 1/9 to 9/1, preferably 2/8 to 8/2, and most preferably 3/7 to 7/3. When the polyethylene is applied to both surfaces of the support, the polyolefin to be applied to the surface where the toner image-receiving layer is not present (i.e., the back side) is, for example, preferably the high-density polyethylene or a blend of the high-density polyethylene and the low-density polyethylene. The molecular weight of the polyethylenes is not particularly limited. Desirably, both of the high-density polyethylene and the low-density polyethylene have a melt index of 1.0 to 40 g/10 min and a high extrudability.

The laminate layer is formed by coating these above materials on one or both surfaces of the above-mentioned base layer. The methods for coating preferably include, for example, a method of coating, impregnating or spraying a resin solution or suspension on the base layer. The thickness of the laminate layer is, for example, 5 to 100 $\mu$m, preferably 15 to 50 $\mu$m.

An undercoating layer may be formed for the purpose of improving the adhesion of the image-receiving layer to the laminate layer. The undercoating layer includes, for example, a gelatin, a mixture of a gelatin with water and an acrylic aqueous solution. When a mixture of a gelatin with water is used, the mixture is, for example, used in a mass ratio of 1:1000 to 20:1000, preferably 2:1000 to 8:1000. The undercoating layer is coated in an amount of 0.05 to 2 g/m$^2$, preferably 0.08 to 5 g/m$^2$ which amount is determined by the weight of the dried undercoating layer. The amount of this undercoating layer may differ depending on the use of the undercoating layer. The thickness of each layer is preferably 0.1 to 2 $\mu$m.

Various suitably selected additives can be contained in each layer of the above-mentioned laminate and/or coated to one or both surfaces thereof as long as achieving of the object of the present invention is not impaired. For example, the additives include brightening agents, antistatic agents, electric conducting agents, fillers, pigments and dyes such as titanium oxide, ultramarine and carbon black, hydrophilic binder, and semiconductive metal oxide such as alumina sol or a tin oxide. For example, pigments such as titanium oxide may be contained in the laminate layer or the undercoating layer, such pigments to be treated to impart white reflection thereto. Concretely, additives described in J. P. KOKAI No. Sho 63-220,246 are usable.

One or both surfaces of the base layer before laminating or coating the undercoating may be surface-treated for the purpose of improving the adhesion thereof to a resin to be coated thereon. The surface treatments include a treatment for forming a glossy surface, or a fine surface, a matte surface or a silk-finish surface as described in J. P. KOKAI No. Sho 55-26,507, and an activation treatment such as a corona discharge treatment, flame treatment, grow-discharge treatment or plasma treatment.

One or both surfaces of each layer of the laminate can also be treated by this activation treatment such as the corona discharge treatment, flame treatment, grow-discharge treatment or plasma treatment for the purpose of improving the adhesion thereof to a layer to be coated thereon.

The thickness of the obtained support is, usually, 25 to 300 $\mu$m, preferably 50 to 260 $\mu$m and more preferably 75 to 220 $\mu$m.

The density of the support is preferably at least 0.7 g/cm$^3$.

The rigidity of the support is variable depending on the purpose thereof. The rigidity of the support for an electrophotographic image-receiving sheet having a photographic image quality is preferably close to that of a support for a color photographic silver salt sheet.

From the viewpoint of the fixing property, the thermal conductivity of the support (paper) used in the present invention at a relative humidity of 65% at 20° C. is, for example, preferably at least 0.50 kcal/m·h·° C. The thermal conductivity can be determined according to a method described in J. P. KOKAI No. Sho 53-66279 by using a transfer paper having a humidity controlled according to JIS P 8111.

The support used in the present invention includes, specifically and generally, synthetic paper, quality paper, art paper, coated paper, cast-coated paper mixing paper, Yankee paper, baryta paper, wallpaper, backing paper, synthetic resin or emulsion impregnating paper, synthetic rubber latex impregnating paper, synthetic resin containing paper, paperboard, cellulose fiber paper and polyolefin coat paper. The support includes, for example, a photographic support such as a paper and synthetic polymer (film) described in "Shashin Kogaku no Kiso (Fundamentals of Photographic Engineering)—Gin'en Shashin-Hen (Silver salt Photos Edition)—" (edited by Nippon Shashin Gakkai and published by Corona Co., Ltd. in 1979), pages 223 to 240, or supports described in J. P. KOKAI Nos. Sho 62-253159, Hei 1-61236. Sho 63-316848, Hei 2-22651, Hei 3-56955, U.S. Pat. No. 5,001,033.

(1-2) Toner Image-Receiving Layer

The electrophotographic image-receiving sheet of the present invention may form a toner image-receiving layer containing a polymer on one or both surfaces of the above-mentioned support. The toner image-receiving layer has at least the functions of receiving an image-forming toner from a developing drum or an intermediate transfer medium by (static) electricity, pressure, etc. in the transferring step and fixing the image by heat, pressure, etc. in the fixing step.

(1-2-1) Polymer

Materials useable for the toner image-receiving layer include a polymer which is capable of being deformed at the fixing temperature and also capable of receiving the toner, for example, a thermoplastic resins are useable.

The thermoplastic resins include, for example, polyester resins, polystyrene resins, styrene/butylacrylate copolymer, and a mixture including 20% or more by weight of these resins. The thermoplastic resins are preferably styrene, styrene/acryl acid ester copolymers, styrene/methacrylic acid ester copolymers, etc. In many cases, since the above-mentioned resins and copolymers are used for forming the toner, the thermoplastic polymer included in the toner image-receiving layer preferably belongs to the same group as that of these resins and copolymers. The polymers which are preferably used are as follows:

(A) Thermoplastic resins having an ester linkage are as follows:

Polyester resins obtained by the condensation of a dicarboxylic acid component such as terephthalic acid, isophthalic acid, maleic acid, fumaric acid, phthalic acid, adipic acid, sebacic acid, azelaic acid, abietic acid, succinic acid, trimellitic acid or pyromellitic acid (such a dicarboxylic acid component may have a sulfonic acid group, carboxyl group or the like substituted therefor) with an alcohol component such as ethylene glycol, diethylene glycol, propylene glycol, bisphenol A, diether derivative of bisphenol A (such as 2 ethylene oxide adduct of bisphenol A or 2 propylene oxide adduct of bisphenol A), bisphenol S, 2-ethylcyclohexyldimethanol, neopentyl glycol, cyclohexyldimethanol or glycerol (such an alcohol component may have a hydroxyl group or the like substituted therefor); polyacrylic acid ester resins or polymethacrylic acid ester resins such as polymethyl methacrylate, polybutyl methacrylate, polymethyl acrylate and polybutyl acrylate; polycarbonate resins; polyvinyl acetate resins; styrene acrylate resins; styrene/methacrylic acid ester copolymer resins and vinyltoluene acrylate resins. Concrete examples of such tehrmoplastic resins having an ester linkage are described in J. P. Kokai Nos. Sho 59-101395, Sho 63-7971, Sho 63-7972, Sho 63-7973 and Sho 60-294862. Commercially available thermoplastic resins usable herein are, for example, Vylon 290, Vylon 200, Vylon 280, Vylon 300, Vylon 103, Vylon GK-140 and Vylon GK-130 (products of Toyobo Co., Ltd.); TUFTONE NE-382, TUFTONE U-5, ATR-2009 and ATR-2010 (products of Kao Corporation); Elitel UE 3500, UE 3210 and XA-8153 (products of Unitika Ltd.); and Polyester TP-220 and R-188 (products of The Nippon Synthetic Chemical Industry Co., Ltd.), The acrylic resins available on the market are, for example, Dianal SE-5437, SE-5102, SE-5377, SE-5649, SE-5466, SE-5482, HR-169, 124, HR-1127, HR-116, HR-113, HR-148, HR-131, HR-470, HR-634, HR-606, HR-607, LR-1065, 574, 143, 396, 637, 162, 469, 216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116 and BR-117 (products of Mitsubishi Rayon Co., Ltd.); Eslec P SE-0020, SE-0040, SE-0070, SE-0100, SE-1010 and SE-1035 (products of Sekisui Chemical Co., Ltd.); ST95 and ST120 (products of Sanyo Chemical Industries, Ltd.); and FM601 (a product of Mitsui Chemical).

(B) Polyurethane resin, etc., (C) Polyamide resin, urea resin, etc., (D) Polysulfone resin, etc., (E) Polyvinyl chloride resin, polyvinylidene chloride resin, vinyl chloride/vinyl acetate copolymer resin, vinyl chloride/vinyl propionate copolymer resin, etc., (F) Polyol resins such as polyvinyl butyral; and cellulose resins such as ethyl cellulose resin and cellulose acetate resin. Especially, a resin containing 70% by mass or more of polyvinyl butyral and having 500 or more, preferably 1000 or more, of an average polymerization degree is preferable. Those resins available on the market are, for example, Denka butyral 3000-1, 4000-2, 5000A and 6000C (products of Denki Kagaku Kogyo Co,. Ltd.); and Esrec BL-1, BL-2, BL-3, BL-S, BX-L, BM-1, BM-2, BM-5, BM-S, BH-3, BX-1 and BX-7 (products of Sekisui Chemical Co., Ltd.), (G) Polycaprolactone resin, styrene/maleic anhydride resin, polyacrylonitrile resin, polyether resins, epoxy resins and phenolic resins, and (H) Polyolefin resins such as polyethylene resin and polypropylene resin; copolymer resins composed of an olefin such as ethylene or propylene and another vinyl monomer; and acrylic resin.

The polymer included in the toner image-receiving layer of the present invention may be, in addition to the above-mentioned synthetic polymers, a mixture or copolymer thereof.

An average molecular weight of the thermoplastic polymer used for forming the toner image-receiving layer is preferably larger than that of the thermoplastic polymer used for forming the toner. However, the average molecular weight may change depending on the relationship between the thermodynamic properties of the toner polymer and that of the image-receiving layer polymer. For example, when the softening temperature of the image-receiving layer polymer is higher than that of the toner polymer, it is preferred that the average molecular weight of the thermoplastic polymer used for forming the toner image-receiving layer be equal to or lower than that of the thermoplastic polymer used for forming the toner. It is also preferred to use a mixture of various thermoplastic polymers having the same compositions but different average molecular weights as the thermoplastic polymer for forming the toner image-receiving layer. It is preferred that the molecular weight distribution of the thermoplastic polymer used for forming the toner image-receiving layer be broader than that of the thermoplastic polymer for forming the toner. The relationship described in J. P. KOKAI No. Hei 8-334,915 is also desirable.

The polymer for forming the toner image-receiving layer used in the present invention may be a water-soluble polymer or a water-dispersed polymer, since either is easy to coat on the support.

The water-soluble polymer is not particularly limited as regards a desirable composition, bonding structure, molecular structure, molecular weight, molecular weight distribution and form so long as it is a polymer which is soluble in water. In this connection, the molecular structure of the water soluble polymer is preferably a water-soluble group such as a sulfonic acid group, a hydroxyl group, a carboxylic acid group, an amino group, an amido group and an ether group.

The water-soluble polymers include, for example, vinylpyrrolidone/vinyl acetate copolymer, styrene/vinylpyrrolidone copolymer, styrene/maleic anhydride copolymer, water-soluble polyesters, water-soluble polyurethane, water-soluble nylon and water-soluble epoxy resin. Also, the water-soluble polymers include, for example, water-soluble polymers mentioned in Research Disclosure No. 17,643 (page 26), No. 18,716 (page 651) and No. 307,105 (pages 873 to 874), and J. P. KOKAI No. Sho 64-13,546 (pages 71 to 75).

The water-dispersed polymer is suitably selected from among a water-dispersed type resin such as water-dispersed acrylic resin, water-dispersed polyester resin, water-dispersed polystyrene resin and water-dispersed urethane resin; an emulsion such as acrylic resin emulsion, polyvinyl acetate emulsion, SBR (styrene/butadiene/rubber) emulsion; and a copolymer, mixture or cation denaturant thereof. A combination of two or more of these resins is also usable. When a gelatin is used, it can be selected from among gelatin treated with lime, gelatin treated with an acid, so-called delimed gelatin having a reduced calcium content and a combination thereof.

The water-dispersed polymers available on the market are, for example, Vylonal MD-1200, MD-1220 and MD-1930 (products of Toyobo Co., Ltd.); Plascoat Z-446, Z-465 and RZ-96 (products of Goo Chemical Industries Co., Ltd.); ES-611 and ES-670 (products of Dainippon Ink and Chemicals, Inc.); Pesresin A-160P, A-210 and A-620 (products of Takamatsu Oil & Fat Co. LTD.); Hiros XE-18, XE-35, XE-48, XE-60 and XE-62 (products of Seiko Chemical Industries); and Julymer AT-210, AT-510, AT-515, AT-613, ET-410, ET-530, ET-533, FC-60 and FC-80 (products of Nihon Junyaku).

The polymer for forming the toner image-receiving layer used in the present invention is preferably TUFTONE u-5 (Kao Corporation); KZA-7049 (products of Unitika Ltd.); and Vylone 103 (products of Toyobo Co., Ltd.).

When the binder for the toner is a polyester resin, the polymer for forming the toner image-receiving layer is preferably the same polyester resin.

(1-2-2) Additives for the Toner Image-Receiving Layer

The materials useable for forming the toner image-receiving layer can include various additives for the toner image-receiving layer such as additives for a thermoplastic resin, a filler, a pigment, an static charge controlling agent, matting agent and a slip agent.

Additives for a Thermoplastic Resin

The additives for a thermoplastic resin are used for improving the thermodynamic property in a resin layer. The additives include a plasticizer, a crosslinking agent, organic or inorganic fillers, an emulsion, dispersion and the like.

Plasticizer

As the plasticizer, known plasticizers for resins are usable. The plasticizer has a function of controlling the fluidization or softening of the toner image-receiving layer by heat and/or pressure in the step of fixing the toner.

The plasticizers include plasticizers described in "*Kagaku Binran* (Handbook of Chemistry)" (edited by Nihon Kagaku-kai and published by Maruzen Co., Ltd.); "*Kasozai—Sono Riron to Ouyou*—(Plasticizers—The Theory and Application Thereof—)" (edited by Koichi Murai and published by Saiwai Book Publishing Co.); "*Kasozai no Kenkyu* (Study of Plasticizers), Part 1 and Part 2 (edited by Kobunshi Kagaku Kyokai"); and "Handbook, Chemicals to be Incorporated into Rubber•Plastic" (edited by Rubber Digest Co.).

The plasticizers include plasticizers described as high-boiling organic solvents and heat solvents; esters described in, for example, J. P. KOKAI Nos. Sho 59-83,154, 59-178,451, 59-178,453, 59-178,454, 59-178,455, 59-178,457, 62-174,754, 62-245,253, 61-209,444, 61-200,538, 65-8145, 62-9,348, 62-30,247 and 62-136,646 and J. P. KOKAI No. Hei 2-235694 (such as phthalic acid esters, phosphoric acid esters, fatty acid esters, abietic acid esters, adipic acid esters, sebacic acid esters, azelaic acid esters, benzoic acid esters, butyric acid esters, epoxidized fatty acid esters, glycolic acid esters, propionic acid esters, trimellitic aid esters, citric acid esters, sulfonic acid esters, carboxylic acid esters, succinic acid esters, maleic acid esters, fumaric acid esters, phthalic acid esters and stearic acid esters), amides (such as fatty acid amides and sulfoamides), ethers, alcohols, paraffins, polyolefin waxes (such as polypropylene waxes and polyethylene waxes), lactones, polyethyleneoxy compounds, silicone oils and fluoric compounds. The plasticizer is preferably a triphenyl phosphate.

Polymers having a relatively low molecular weight can be used as the plasticizer. The molecular weight of the polymer is preferably lower than that of the polymer to be plasticized. The molecular weight is not higher than 15,000, preferably not higher than 8,000. When a polymer plasticizer is used, it is preferably a polymer belonging to the same group as that of the polymer to be plasticized. For the plasticization of a polyester resin, a polyester of a low molecular weight is preferred. Oligomers are also usable as the plasticizer.

In addition, commercially available plasticizers are usable. They include, for example, Adecacizer PN-170 and PN-1430 (Asahi Denka Kogyo K. K.); PARAPLEX-G-25, G-30 and G-40 (C. P. HALL Co.); and Ester Gum 8L-JA, Ester R-95, Pentalin 4851, FK115, 4820, 830, Luizol 28-JA, Picolastic A75, Picotex LC and Crystalex 3085 (Rika Hercules).

The plasticizer is optionally usable for relieving the stress or strain caused when the toner particles are embedded in the toner image-receiving layer (such as physical strains caused by elastic power, viscosity or the like, and strains caused by the material balance of the molecule, main chain of binder, pendant part, etc.).

The plasticizer may be microscopically dispersed in the toner image-receiving layer or microscopically phaseseparated in an island-sea-type separation, or it may be thoroughly mixed with another component such as a binder to form a solution.

The plasticizer of the present invention is preferably used in an amount of, for example, 0.001 to 200% by mass, preferably 0.1 to 100% by mass, and more preferably 1 to 50% by mass, based on the total mass of all materials used for forming the toner image-receiving layer.

The plasticizer is usable also for the purposes of controlling the slipping property (improvement in the ease of carrying a sheet by a reduction in friction), improving the offset in the fixing part (peeling of the toner or layer from the fixing part) and controlling of the curl balance and the electrification (formation of a toner electrostatic image).

Crosslinking Agent

The crosslinking agent can be incorporated for the purpose of controlling the storability, thermoplasticity, etc. of the toner image-receiving layer. The crosslinking agents usable herein are compounds having at least two reactive groups selected from among the epoxy group, isocyanato group, aldehyde group, active halogen groups, active methylene group, acetylene group and other well-known reactive groups.

In addition to the above-mentioned covalent bond forming groups, compounds having at least two groups capable of forming a bond such as a hydrogen bond, ion bond and coordination bond are also usable.

Compounds known as a coupling agent, curing agent, polymerizing agent, polymerization accelerator, coagulating agent, film-forming agent, film-forming assistant, etc. for resins are also usable as the crosslinking agent. The coupling agents are, for example, chlorosilanes, vinylsilanes, epoxysilanes, aminosilanes, alkoxyaluminum chelates and titanate coupling agents. The coupling agents described in *Binran Gomu•Plastic Haigo Yakuhin* (Handbook of Chemicals to be Incorporated into Rubbers and Plastics)" (edited by Rubber Digest Co.) are also usable.

Filler

As the filler used in the present invention, organic and inorganic fillers known as reinforcing agent, filler or reinforcing material for resins are usable. The fillers can be selected with reference to "*Binran Gomu•Plastic Haigo Yakuhin* (Handbook of Chemicals to be Incorporated into Rubbers and Plastics)" (edited by Rubber Digest Co.), "*Plastic Haigozai, Kiso to Oyo* (Additives to Plastics, Base and Application, New Edition) (published by Taisei Co.) and "Filler Handbook" (published by Taisei Co.).

The fillers usable herein include various inorganic fillers (or pigments). The inorganic pigments are, for example, silica pigments, alumina pigments, titanium dioxide pigments, zinc oxide pigments, zirconium oxide pigments, mica-like iron oxide pigments, white lead, lead oxide pigments, cobalt oxide pigments, strontium chromate, molybdenum pigments, smectites, magnesium oxide pigments, calcium oxide pigments, calcium carbonate pigments, mullite and a mixture of two or more of these pigments. Among these pigments, silica pigments and alumina pigments are preferred.

As the fillers, those fillers having a small particle diameter are preferred. The fillers having a small particle diameter are desirable because use thereof enables roughening of the surface of the toner image-receiving layer to be prevented.

The silica pigments include spherical silica and amorphous silica. The silica pigments can be synthesized by a dry method, wet method or aerogel method. The hydrophobic silica particles may be surface-treated with a trimethylsilyl group or a silicone. Colloidal silica is particularly preferable as a silica pigment. Although the preferable range of the average particle diameter of the silica pigment varies depending on the purpose for which it is to be used, in order to keep the degree of whiteness of an image receiving sheet, the average particle diameter of the silica pigment is 4 to 120 nm, preferably 4 to 90 nm.

The silica pigment for providing an ink receiving ability is preferably porous. The average pore diameter of the porous silica pigment is preferably 50 to 5000 nm. The average pore volume per weight of the porous silica pigment is preferably 0.5 to 3 ml/g.

Alumina pigments include anhydrous alumina and alumina hydrate. Crystal types of anhydrous alumina usable herein are $\alpha$, $\beta$, $\gamma$, $\delta$, $\zeta$, $\eta$, $\theta$, $\kappa$, $\rho$ and $\chi$. More preferably, the alumina hydrates, particularly alumina monohydrates or trihydrates, can be used. Alumina monohydrates include pseudo-boehmite, boehmite and diaspore. Alumina trihydrates include gibbsite and bayerite.

The average particle diameter of the alumina pigment is, for example, 4 to 5000 nm, preferably 4 to 200 nm, to keep the degree of whiteness of an image-receiving sheet. In order to provide an ink receiving ability, an alumina particle is preferably porous. The average pore diameter of the porous alumina particle is preferably 100 to 5000 nm. The average pore volume per weight of the porous alumina particle is preferably 0.3 to 3 ml/g.

An alumina hydrate can be synthesized by a sol/gel method wherein ammonia is added to an aluminum salt solution to precipitate it or by a method wherein an alkali aluminate is hydrolyzed. Anhydrous alumina can be synthesized by dehydrating an alumina hydrate by heating.

The amount of the inorganic pigment is preferably 5 to 2,000% by mass based on the dry mass of the binder in a layer to which the inorganic pigment is to be added.

Pigment

As the pigment used in the present invention, a fluorescent brightening agent, a white pigment, a coloring pigment and a dye are usable. By adding these pigments, the image quality, particularly degree of whiteness of the image-receiving sheet can be improved. By controlling the thermodynamic property, a receiving ability for a water-soluble ink, an ink for ink jet printing, etc. can be provided.

As the fluorescent brightening agent, known compounds having an absorption band in a near-ultraviolet zone and emitting fluorescence in a range of 400 to 500 nm is usable. The fluorescent brightening agents used in the present invention are, for example, the compounds described in "The Chemistry of Synthetic Dyes" (edited by K Veen Rataraman), Volume V, Chapter 8. Concretely, these compounds include stilbene compounds, coumarin compounds, biphenyl compounds, benzoxazoline compounds, naphthalimide compounds, pyrazoline compounds and carbostyryl compounds. Commercially available products containing such compounds include White Falfar PSN, PHR, HCS, PCS and B (Sumitomo Chemical Co., Ltd.) and UVITEX-OB (Ciba-Geigy).

As the white pigments, the inorganic pigments (titanium oxide, calcium carbonate, etc.) described in the section "Filler" above are usable. For example, the above-mentioned inorganic pigments in the form of solid particles are useable.

The coloring pigments include various pigments described in, for example, J. P. KOKAI No. Sho 63-44653 and azo pigments (azo lakes (Carmine 6B and Red 2B), insoluble azo pigments (Monoazo Yellow, Disazo Yellow, Pyrazolo Orange and Vulcan Orange) and condensed azo pigments (Chromophthal Yellow and Chromophthal Red)), polycyclic pigments (phthalocyanine pigments (Copper Phthalocyanine Blue and Copper Phthalocyanine Green), dioxazine pigments (Dioxazine Violet), isoindolinone pigments (Isoindolinone Yellow), threne pigments (perylene, perinone, flavanthrone and thioindigo)), lake pigments (Malachite Green, Rhodamine B, Rhodamine G and Victoria Blue B), inorganic pigments (oxides, titanium dioxide, red iron oxide, sulfates (precipitated barium sulfate), carbonates (precipitated calcium carbonate), silicates (hydrous silicates and anhydrous silicates) and metal powders (aluminum powder, bronze powder, zinc powder, carbon black, chrome yellow and Prussian blue)) and the like.

As the dyes, various known dyes are usable. The oil-soluble dyes include anthraquinone compounds and azo compounds. Examples of the water-insoluble dyes include vat dyes such as C. I. Vat Violet 1, C. I. Vat Violet 2, C. I. Vat Violet 9, C. I. Vat Violet 13, C. I. Vat Violet 21, C. I. Vat Blue 1, C. I. Vat Blue 3, C. I. Vat Blue 4, C. I. Vat Blue 6, C. I. Vat Blue 14, C. I. Vat Blue 20 and C. I. Vat Blue 35; disperse dyes such as C. I. Disperse Violet 1, C. I. Disperse Violet 4, C. I. Disperse Violet 10, C. I. Disperse Blue 3, C. I. Disperse Blue 7 and C. I. Disperse Blue 58; and oil-soluble dyes such as C. I. Solvent Violet 13, C. I. Solvent Violet 14, C. I. Solvent Violet 21 and C. I. Solvent Violet 27; and C. I. Solvent Blue 11, C. I. Solvent Blue 12, C. I. Solvent Blue 25 and C. I. Solvent Blue 55.

Colored couplers used for silver salt photography are also preferably used as the dyes.

The electrophotographic image-receiving sheet of the present invention preferably has a high degree of whiteness. As for the degree of whiteness, L* value in CIE 1976 (L*a*b*) color space is at least 80, preferably at least 85 and more preferably at least 90. The coloration of the white color is desirably as neutral as possible. As for the coloration of the white color, the value of $(a^*)^2+(b^*)^2$ in L*a*b* space is preferably not higher than 50, more preferably not higher than 18 and most preferably not higher than 5.

The electrophotographic image-receiving sheet of the present invention preferably has a high gloss. As for the surface gloss, 45° surface gloss in the whole zone ranging from white (no toner) to black (maximum toner concentration) is preferably not lower than 60, more preferably not lower than 75 and most preferably not lower than 90. When the surface gloss is not higher than 110, the image quality is prevented from becoming like a metallic gloss.

The surface gloss can be determined according to JIS Z 8741.

The electrophotographic image-receiving sheet used in the present invention preferably has a high smoothness. As for the degree of smoothness, the arithmetic mean roughness (Ra) in the whole zone ranging from white (no toner) to black (maximum toner density) is preferably not higher than 3 $\mu$m, more preferably not higher than 1 $\mu$m and most preferably not higher than 0.5 $\mu$m.

The arithmetic mean roughness can be determined according to JIS B 0601, B 0651 and B 0652.

Static Charge Controlling Agent

A static charge controlling agent of the present invention is preferably incorporated into the toner image-receiving layer of the present invention for the purpose of controlling the toner transfer and adhesion and also for the purpose of preventing the electrostatic adhesion of the toner image-receiving layer. As the static charge controlling agents, both a antistatic agent and a static charge controlling agent which are known in the art are useable. Surfactants such as cationic surfactants, anionic surfactants, amphoteric surfactants and nonionic surfactants, high-molecular electrolytes and conductive metal oxides are also useable as the static charge controlling agents.

The static charge controlling agents include, for example, cationic antistatic agents such as quaternary ammonium salts, polyamide derivatives, cation modified polymethyl methacrylate and cation modified polystyrene; anionic antistatic agents such as alkyl phosphates and anionic polymers; and nonionic antistatic agents such as fatty acid esters and polyethylene oxides. However, the static charge controlling agents are not limited to these above agents.

When the toner has a negative electric charge, the static charge controlling agent is preferably cationic or nonionic.

The conductive metal oxides include ZnO, $TiO_2$, $SnO_2$, $Al_2O_3$, $In_2O_3$, $SiO_2$, MgO, BaO and $MoO_3$. These conductive metal oxides are usable either alone or in the form of complex oxides of them. The metal oxides may further contain other elements. For example, ZnO can contain (or dope) Al, In or the like, $TiO_2$ can contain (or dope) Nb, Ta or the like, and $SnO_2$ can contain (or dope) Sb, Nb, halogen elements or the like.

The toner image-receiving layer of the present invention preferably has a surface electric resistance in the range of $1\times10^6$ to $1\times10^{15}$ Ω (under conditions of 25° C., 65% RH). When this resistance is $1\times10^6$ Ω or more, a sufficient amount of the toner is transferred to the toner image-receiving layer, whereby a toner image having appropriate density can be obtained. On the contrary, when the surface electric resistance is $1\times10^{15}$ Ω or less, a sufficient amount of the toner is transferred without forming an excessive electric charge, whereby a toner image having appropriate density can be obtained. Furthermore, when the surface electric resistance is $1\times10^{15}$ Ω or less, dust is not adhered to the electrophotographic image-receiving sheet due to static electricity while the sheet is being handled, and the possibility of causing misfeeding, a double transferring, a discharge mark or a toner transfer error is reduced.

The optimum surface electric resistance of a transparent toner image-receiving layer is $10^{10}$ to $10^{13}$ Ω/cm$^2$, preferably $5\times10^{10}$ to $5\times10^{12}$ Ω/cm$^2$. The amount of the antistatic agent used is such that the surface electric resistance will be in this range. The surface electric resistance on the back surface of the support (opposite to the toner image-receiving layer) is $5\times10^8$ to $3.2\times10^{10}$ Ω/cm$^2$, preferably $1\times10^9$ to $1\times10^{10}$ Ω/cm$^2$.

In this connection, the surface electric resistance is determined according to JIS K 6911. Namely, the water content of a sample is controlled by keeping it in an atmosphere having a temperature of 20° C. and a humidity of 65% for at least 8 hours, then applying an electric current to the sample under 100 V with R8340 (Advantest Corporation) under the same environmental conditions as above for 1 minute, after which the surface electric resistance is determined.

Matting Agent

A matting agent is used for preventing adhesion among the image-receiving sheets, and preventing paper jamming in the electrophotographic device. As the matting agent, various known materials are useable. Solid particles used for the matting agent can be classified into inorganic particles and organic particles. The materials used for the matting agent include oxides (such as silicon dioxide, titanium oxide, magnesium oxide and aluminum oxide), alkaline earth metal salt (such as barium sulfate, calcium carbonate and magnesium sulfate), silver halide (such as silver chloride and silver bromide), and glass.

The inorganic matting agents usable herein are described, for example, in West German Patent No. 2529321; British Patent Nos. 760775 and 1260772; and U.S. Pat. Nos. 1,201, 905, 2,192,241, 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245 and 4,029,504.

The materials used for the organic matting agent include starch, cellulose esters (such as cellulose acetate propionate), cellulose ethers (such as ethyl cellulose) and synthetic resins. The synthetic resins are preferably water-insoluble or difficult to dissolve in water. Examples of the water-insoluble or difficult to dissolve in water synthetic resins include poly(meth)acrylic acid esters (such as poly-alkyl (meth)acrylates, polyalkoxyalkyl (meth)acrylates and polyglycidyl (meth)acrylates), poly(meth)acrylamides, polyvinyl esters (such as polyvinyl acetate), polyacrylonitrile, polyolefins (such as polyethylene), polystyrene, benzoguanamine resin, formaldehyde-condensed polymers, epoxy resins, polyamides, polycarbonates, phenolic resins, polyvinyl carbazole and polyvinylidene chloride. Copolymers comprising a combination of the monomers used for the above-described polymers are also usable.

When the material for the organic matting agent is a copolymer, it may contain a small amount of a hydrophilic repeating unit. Examples of the monomers constituting the hydrophilic repeating units include acrylic acid, methacrylic acid, α, β-unsaturated dicarboxylic acids, hydroxyalkyl (meth)acrylates, sulfoalkyl (meth)acrylates and styrene sulfonic acid.

The organic matting agents are described in, for example, British Patent No. 1,055,713, U.S. Pat. Nos. 1,939,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,379, 3,754,924 and 3,767,448, and J. P. KOKAI Nos. Sho 49-106,821 and 57-14,835.

Two or more kinds of the solid particles are also useable in these organic matting agents. The average particle diameter of the solid particles is, for example, 1 to 100 μm, preferably 4 to 30 μm. The solid particles are used in an amount of 0.01 to 0.5 g/m$^2$, preferably 0.02 to 0.3 g/m$^2$.

As the slip agent, various known materials are useable. The slip agents are, for example, sodium higher alkylsulfates, higher alcohol/higher fatty acid esters, Carbowax, higher alkyl phosphoric acid esters, silicone compounds, modified silicones and cured silicones.

Polyolefin waxes, fluorine oils, fluorine waxes, carnauba wax, microcrystalline wax and silane compounds are also useable as the slip agent. The specific slip agents usable herein are described in U.S. Pat. Nos. 2,882,157, 3,121,060 and 3,850,640; French Patent No. 2,180,465; British Patent Nos. 955,061, 1,143,118, 1,263,722, 1,270,578, 1,320,564, 1,320,757, 2,588,756, 2,739,891, 3,018,178, 3,042,522, 3,080,317, 3,082,087, 3,121,060, 3,222,178, 3,295,979, 3,489,567, 3,516,832, 3,658,573, 3,679,411 and 3,870,521; J. P. KOKAI No. Sho 49-5,017, 51-141,623, 54-159,221 and 56-81,841; and Research Disclosure No. 13,969.

The amount of the slip agent used is 5 to 500 mg/m$^2$, preferably 10 to 200 mg/m$^2$. When an oil for preventing the offset to the fixing member in the fixing part is not used or, in other words, in case of so-called oilless fixing, the amount of the slip agent used is, for example, 30 to 3,000 mg/m$^2$, preferably 100 to 1,500 mg/m$^2$.

Because the waxy slip agent is difficult to dissolve in organic solvents, it is preferred that an aqueous dispersion thereof be prepared and then a dispersion thereof with a thermoplastic resin solution be prepared and coated. In such a case, wax slip agent is present in the form of fine particles in the thermoplastic resin. In this case, the amount of the slip agent is 5 to 10,000 mg/m$^2$, preferably 50 to 5,000 mg/m$^2$.

Other Additives

The materials useable for the toner image-receiving layer of the present invention may contain various additives in order to improve the stability of the output image and also the stability of the image-receiving layer itself. The additives for these purposes include various known antioxidants, agents for preventing aging, agents for preventing deterioration, agents for preventing deterioration caused by ozone, ultraviolet absorbers, light stabilizers, antiseptics and antifungal agents.

The antioxidants include, for example, chroman compounds, coumaran compounds, phenol compounds (such as hindered phenol), hydroquinone derivatives, hindered amine derivatives and spiroindane compounds. The antioxidants usable herein are those described in J. P. KOKAI Sho 61-159644. The agents for preventing aging are, for example, those described on pages 76 to 121 of "*Binran Gomu•Plastic Haigo Yakuhin* (Handbook of Chemicals to be Incorporated into Rubbers and Plastics)" (edited by Rubber Digest Co. in 1993).

The ultraviolet absorbers are, for example, benzotriazole compounds (U.S. Pat. No. 3,533,794), 4-thiazolidone compounds (U.S. Pat. No. 3,352,681), benzophenone compounds (J. P. KOKAI No. Sho 46-2784) and ultraviolet absorbing polymers (J. P. KOKAI No. Sho 62-260152).

The metal complexes are, for example, those described in U.S. Pat. Nos. 4,241,155, 4,245,018 and 4,254,195, and J. P. KOKAI Nos. Sho 61-88,256, Sho 62-174,741, Sho 63-199, 248, Hei 1-75,568 and Hei 1-74,272.

Further, ultraviolet absorbers and photo stabilizers described on pages 122 to 137 of "*Binran Gomu•Plastic Haigo Yakuhin* (Handbook of Chemicals to be Incorporated into Rubber and Plastics)" (edited by Rubber Digest Co.) are also preferably used.

The materials useable for the toner image-receiving layer of the present invention can further contain known photographic additives. The photographic additives are described in Research Disclosure (hereinafter referred to as "RD") Nos. 17,643 (December, 1978), 18,716 (November, 1979) and 307,105 (November, 1989). The pages in RD where these additives are summarized are indicated in the following table.

| | Additive | RD 17643 | RD 18,716 | RD 307,105 |
|---|---|---|---|---|
| 1 | Whitening agent | p. 24 | p. 648, right column | p. 868 |
| 2 | Stabilizer | pp. 24–25 | p. 649, right column | pp. 868–870 |
| 3 | Light absorber UV absorber | pp. 25–26 | p. 649, right column | p. 873 |
| 4 | Dye image stabilizer | p. 25 | p. 650, right column | p. 872 |
| 5 | Hardening agent | p. 26 | p. 651, left column | pp. 874–875 |
| 6 | Binder | p. 26 | p. 651, left column | pp. 873–874 |
| 7 | Plasticizer, lubricant | p. 27 | p. 650, right column | p. 876 |
| 8 | Coating aid Surfactant | pp. 26–27 | p. 650, right column | pp. 875–876 |
| 9 | Antistatic agent | p. 27 | p. 650, right column | pp. 876–877 |
| 10 | Matting agent | | | pp. 878–879 |

The toner image-receiving layer used for the present invention is applied onto the support by coating a coating solution containing a polymer used for forming the toner image-receiving layer with a wire coater and then drying it.

The coating solution is prepared, for example, by dissolving additives such as a thermoplastic polymer and plasticizer into an organic solvent such as alcohols and ketones, or by dispersing them uniformly. The organic solvents used herein are, for example, methanol, isopropyl alcohol and methyl ethyl ketone. When the polymer used for the toner image-receiving layer is water-soluble, the toner image-receiving layer is prepared by coating the polymer aqueous solution onto the support. Using the water-insoluble polymer, the water dispersions thereof can be coated on the support.

The film forming temperature of the polymer used for the present invention is preferably a room temperature or more for storage before printing, and is preferably up to 100° C. for fixing a toner particle. The toner image-receiving layer of the present invention is coated with such an amount of coating solution that the weight of the coating after drying is, for example, 1 to 20 $g/m^2$, preferably 4 to 15 $g/m^2$. The thickness of the toner image-receiving layer is, for example, 1 to 20 μm, preferably 4 to 15 μm.

(1-3) Other Layers

The image-receiving sheet for electrophotography of the present invention may have other layer such as a contact improving layer, a cushion layer, a moisture impermeability layer, an intermediate layer, an undercoating layer, a chargeability-controlling (antistatic) layer, a reflecting layer, a color controlling layer, a storability improving layer, a releasing layer, an anti-curling layer and a smoothing layer, between the support and the toner image-receiving layer or on the part of the surface of the sheet on which the toner image-receiving layer is not applied. The external surface of the sheet on which the toner image-receiving layer is not applied may have a back layer. One or more of these other layers can be applied to the sheet.

The contact improving layer can be applied for the purpose of improving contact between the support and toner image-receiving layer as well as among the other layers. The materials used for the contact improving layer may include the additives described above, particularly the crosslinking agent.

The cushion layer is applied for the purpose of improving toner receptivity.

The moisture impermeability layer is applied for the purpose of reducing the environmental moisture affectability in the situations of storing before outputting, and printing during and after outputting.

The back layer can be applied on both surfaces of the support, and preferably applied on the surface opposite to the toner image-receiving layer. The back layer is useable for the purposes of imparting output ability at the backside of the base paper, improving the backside image output quality, improving the curl balance, providing writing ability, providing inkjet and other printing suitability and improving the passability through the machines.

The materials used for the back layer include the additives described above, particularly the matting agent, slip agent and the static charge controlling agent as mentioned above.

The backside which has no toner image-receiving layer may be used as an oil-absorbing layer when a releasing oil is used for a fixing roller or the like for preventing offset in the fixing step.

In an image-receiving sheet of a transmission type, which is composed of a transparent support and a toner image-receiving layer and the like formed thereon, it is preferred that the layers on the support also be transparent. In an image-receiving sheet of a reflection type, which is composed of a reflecting support and an image-receiving layer and the like formed thereon, it is not necessary that the respective layers on the support be transparent, and instead they are preferably white. The degree of whiteness is preferably at least 85% as determined by a method of JIS P 8123. It is preferred that the spectral reflectance be at least 85% in a wavelength range of 440 nm to 640 nm and that the difference between the maximum spectral reflectance and the minimum spectral reflectance be not larger than 5% in this wavelength range. It is more preferred that the spectral reflectance be at least 85% in a wavelength range of 400 to 700 nm and that the difference between the maximum spectral reflectance and the minimum spectral reflectance be not larger than 5% in the same wavelength range.

In the transmission type image-receiving sheet composed of the transparent support and the image-receiving layer and the like formed thereon, the back layer is preferably also transparent. On the other hand, in the reflection type image-receiving sheet, which is composed of a reflecting support and a toner image-receiving layer and the like formed thereon, the back layer is not necessarily transparent and the color thereof is not limited. However, in a both-sided image-receiving sheet which forms an image on the back surface of an electrophotographic image-receiving sheet, the back layer is preferably white. The degree of whiteness and the spectral reflectance of the back layer are preferably at least 85%, as in the case of those of the surface layer.

The electrophotographic image-receiving sheet used for the present invention has an opacity of at least 85%, preferably at least 90%, as determined by a method of JIS P 8138.

(2) Toner

The image is formed by transferring a toner on the electrophotographic image-receiving sheet of the present invention. The methods for transferring the toner include a method used in a common electrophotographic method, such as the direct transferring method wherein a toner image formed on a development roller is directly transferred to an image-receiving sheet, or the intermediate transfer belt method wherein a toner image is primary transferred to the intermediate transfer belt and then the toner image is transferred to the image-receiving sheet. In terms of environmental stability and extending image quality, the intermediate transfer belt method is more desirable.

The toner used herein contains, for example, a polymer (a binder resin), a colorant and an optional releasing agent.

As the polymer, known binder resins are useable. Concretely, these binder resins include homopolymers and copolymers such as styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly desirable binder resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. In these resins, styrene/acryl resins are particularly preferable.

As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. The colorant content is, for example, 2 to 8% by mass. When the colorant content is 2% or more by mass, a sufficient coloring power can be obtained, and when it is 8% or less by mass, good transparency can be obtained.

The toner of the present invention optionally contains a releasing agent. The releasing agents preferably used herein are waxes. Concretely, the releasing agents usable herein are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the amount of the wax inclined to be exposed to the toner particle surface, waxes having a melting point in the range of 30 to 150° C. are preferred and those having a melting point in the range of 40 to 140° C. are more preferred.

The wax is, for example, 0.1 to 10% by mass, and preferably 0.5 to 7% by mass, based on the toner.

The toner used in the present invention may contain an additive. Fine powders of inorganic compounds and fine particles of organic compounds are used as the additive. Fine particles of the inorganic compounds are those of, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2\ SiO_2$, $CaCO_3$, $MgCO_3$, $BaSO_4$ and $MgSO_4$. The fine particles of organic compounds are those of fatty acids and derivatives thereof and metal salts thereof, and also those of resins such as fluororesins, polyethylene resins and acrylic resins.

The average particle diameter of the toner used in the present invention is, for example, 3 to 15 μm, preferably 4 to 8 μm. The storage elastic modulus G' of the toner per se (determined at an angular frequency of 10 rad/sec) at 150° C. is preferably in the range of 10 to 200 Pa.

The toner used in the present invention can be obtained by a pulverization method or a suspension granulation method, preferably the suspension granulation method.

In the pulverization method, the toner is obtained by kneading, pulverization and classification. Concretely, the toner is obtained by mixing it with a binder resin, a wax, an additive, and other toner constituting materials, sufficiently kneading the resultant with a hot kneader such as a hot roll, kneader or extruder, and then mechanically pulverizing and classifying the resultant.

In the suspension granulation method, the toner is mixed with a binder resin, a colorant and a releasing agent and, if necessary, a magnetic substance, an antistatic agent and other additives in a solvent having no affinity for water. The resultant composition is covered with a polymer having a carboxyl group, the resultant product is then dispersed in an aqueous medium in the presence of a hydrophilic inorganic dispersing agent having a BET specific surface area of 10 to 50 $m^2/g$ and/or a viscosity regulator, and then, if necessary, the resultant suspension is diluted with an aqueous medium. The solvent is removed by heating the resultant suspension and/or reducing the pressure to obtain a toner.

(3) Fixing Belt

The electrophotographic image-receiving sheet having the transferred toner of the present invention is heated and pressed under the specific temperature and pressure, as a result of which, the toner is received in the toner image-receiving layer. That is, for example, the toners and the toner/the toner image-receiving layer are melted together so that they are compatible with each other, and then the toner is fixed on the surface of the image-receiving sheet. In this connection, the fixing can be achieved by using a known fixing method such as the fixing method using a heating/pressing roller and the belt fixing method using a fixing belt. The belt fixing method includes, for example, an oil-less type belt fixing method such as described in J. P. KOKAI Nos. Hei 11-2,986 and 11-352,819; a method which can achieve secondary transferring and fixing simultaneously such as described in J. P. KOKAI Nos. Hei 11-231671 and 5-341666 known in the art. From the viewpoint of image quality such as gloss and smoothness, the belt fixing method is preferable. The embodiment of the present invention will be more specifically explained as follows, based on FIG. 2 which shows the typical belt fixing method. In this connection, the present invention is not limited to the embodiment shown in FIG. 2.

Figure 2:
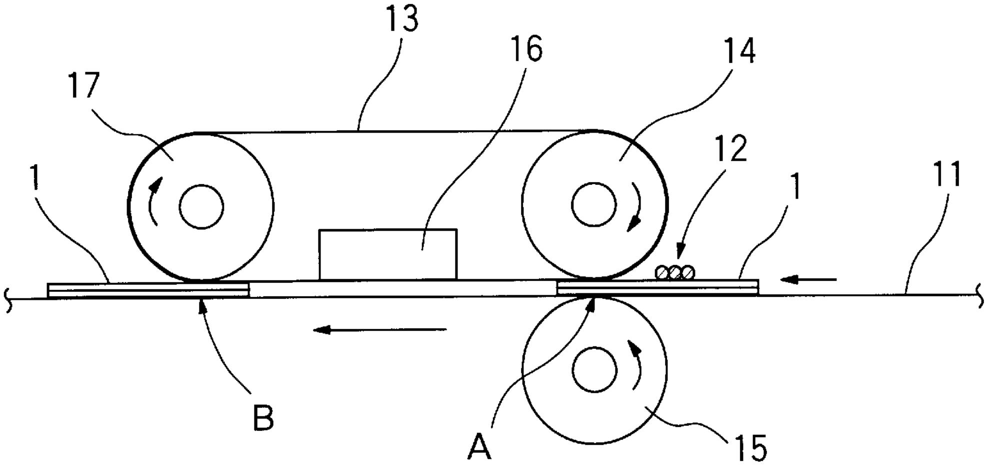
FIG. 2 is a schematic diagram showing an intermediate transfer belt type electrophotographic device of the present invention, wherein 11 represents a belt conveyor, 12 represents a toner, 13 represents a fixing belt, 14 represents a heating roller, 15 represents a pressure roller, 16 represents a cooling device, and 17 represents a tension roller.

First, a toner (12) is transferred on a image-receiving sheet (1) in the image forming device (which is not shown in FIG. 2). The image-receiving sheet (1) on which the toner (12) is attached is sent to a point A by a belt conveyor (11), at which point the image-receiving sheet (1) is passed between a heating roller (14) and a pressure roller (15) to heat and press it at a certain temperature and pressure, wherein the temperature is a temperature at which a toner image-receiving layer of the image-receiving sheet (1) and the toner (12) can be sufficiently softened (toner fixing temperature). The toner fixing temperature is a temperature of the surface of the image-receiving layer which is determined at the point (A) where the heating roller (14) and the pressure roller (15) nip each other. The fixing temperature is, for example, 100 to 180° C., preferably 120 to 160° C. The pressure is a pressure of the surface of the image-receiving layer which is determined at the point (A) where the heating roller (14) and the pressure roller (15) nip each other. The pressure is, for example, 1 to 10 $kg/cm^2$, preferably 2 to 7 $kg/cm^2$.

After the above heating and pressing, the image-receiving sheet (1) is sent to a cooling device (16) by a fixing belt (13), and then, for example, the image-receiving sheet (1) is cooled at a temperature of less than or equal to a softening point or glass transition point of the polymer (binder) included in the toner and/or of the image-receiving layer polymer included in the image-receiving sheet, preferably 30 to 70° C. The cooled image-receiving sheet (1) is then sent to Point B by the fixing belt (13), at which point the fixing belt (13) is removed by being rotated onto a tension roller (17), thereby releasing the image-receiving sheet (1) from the fixing belt (13), while leaving the image-receiving sheet on the belt conveyor (11).

When the surface tension for a polymer included in the toner image-receiving layer is larger than that for a toner, and when the difference between these surface tensions is a certain degree or larger, it is preferred that the toner be transferred to the image-receiving sheet in good condition, and adhesiveness of the toner for the toner image-receiving layer is preferably improved. Concretely, the surface tensions for said polymer and said toner at said toner fixing temperature are determined. When the polymer and toner are in the melted state in the measurement condition, these surface tensions are determined by a pendant drop method, a bubble pressure method and the like. For example, in the pendant drop method, the polymer or the toner are melted at the toner fixing temperature to obtain a liquid form thereof, and a drop of the resultant is dropped from a needlepoint to enable the shape of the droplet to be analyzed and measured. In this case, it is preferred that said surface tension for the polymer ($\gamma_p$) (mN/m) and said surface tension for the toner ($\gamma_t$) (mN/m) meet the following formula (I);

$$\gamma_p - \gamma_t \geqq 8 \qquad \text{(I)}$$

preferably meet $\gamma_p - \gamma_t \geqq 9$.

The polymer described herein refers to one or more polymers which is included in the above-mentioned toner image-receiving layer, and excludes the additives for the toner image-receiving layer.

When a contact angle for the surface of the fixing belt is larger than that for the surface of the toner image-receiving layer in the image-receiving sheet, and when the difference between these contact angles is a certain degree or larger, it is preferred that the image-receiving sheet and the fixing belt be peeled from each other in good condition, that the offset of the toner and the image-receiving layer be prevented, and that the gloss be enhanced. The contact angle is determined by a static method at the above-mentioned temperature and using a melting toner. Specifically, a toner which is solidified in the form of about a 2 mm cube is placed on the surface of the image-receiving layer heated at the toner fixing temperature. The contact angle is determined when the toner is melted. In this case, it is desirable that the contact angle for the surface of the fixing belt ($\theta_1$) (°) and the contact angle for the surface of the fixing belt ($\theta_2$) (°) meet the following formula (II);

$$\theta_2 - \theta_1 \geqq 10 \qquad \text{(II)}$$

preferably meet $\theta_2 - \theta_1 \geqq 13$.

Furthermore, when a surface free energy for the surface of the toner image-receiving layer in the image-receiving sheet is larger than that for the surface of the fixing belt, and when the difference between these surface free energies is a certain degree or larger, it is preferred that the image-receiving sheet and the fixing belt be peeled from each other in good condition, that the offset in the portion of the sheet where the image or the toner is not applied be prevented, and that the gloss be enhanced. Specifically, the surface free energy is determined by measuring contact angles ($\theta_i$) and ($\theta_j$) for two liquids i and j in respect of the surface of the toner image-receiving layer and the surface of the fixing belt, respectively, and calculating a dispersion forces component ($g^d$) and a polar forces component ($g^p$), and a solid surface free energy (G) from the following Extended Fowkes equation;

$$G = g^d + g^p$$

(wherein $$g^d = \frac{\begin{vmatrix} \frac{\gamma_{li}}{2}(1+\cos\theta_i) & \sqrt{\gamma_{li}^p} \\ \frac{\gamma_{lj}}{2}(1+\cos\theta_j) & \sqrt{\gamma_{lj}^p} \end{vmatrix}^2}{\begin{vmatrix} \sqrt{\gamma_{li}^d} & \sqrt{\gamma_{li}^p} \\ \sqrt{\gamma_{lj}^d} & \sqrt{\gamma_{lj}^p} \end{vmatrix}^2} \qquad g^p = \frac{\begin{vmatrix} \sqrt{\gamma_{li}^d} & \frac{\gamma_{li}}{2}(1+\cos\theta_i) \\ \sqrt{\gamma_{lj}^d} & \frac{\gamma_{lj}}{2}(1+\cos\theta_j) \end{vmatrix}^2}{\begin{vmatrix} \sqrt{\gamma_{li}^d} & \sqrt{\gamma_{li}^p} \\ \sqrt{\gamma_{lj}^d} & \sqrt{\gamma_{lj}^p} \end{vmatrix}^2}$$

$\gamma_{li}$ and $\gamma_{lj}$ are surface tensions of the liquids i and j, $\gamma^d_{li}$ and $\gamma^d_{lj}$ are dispersion forces component of the surface tensions of the liquids i and j, $\gamma^p_{li}$ and $\gamma^p_{lj}$ are polar forces component of the surface tensions of the liquids i and j, all of which are eigenvalues of the liquids i and j. $\theta_i$ and $\theta_j$ are contact angles for the liquids i and j.).

In this case, it is preferred that the surface free energy for the surface of the toner image-receiving layer ($G_1$) (mN/m) and the surface free energy for the surface of the fixing belt ($G_2$) (mN/m) meet the following formula (III);

$$G_1 - G_2 \geqq 10 \qquad \text{(III)}$$

preferably meet $G_1 - G_2 \geqq 15$.

Furthermore, it is desirable that the above-mentioned polar forces component of the surface free energy for the surface of the toner image-receiving layer ($g^p{}_1$) (mN/m) and the above-mentioned polar forces component of the surface free energy for the surface of the fixing belt ($g^p{}_2$) (mN/m) meet the following formula (IV);

$$g^p{}_1 - g^p{}_2 \geqq 0.3 \qquad \text{(IV)}$$

preferably meet; $g^p{}_1 - g^p{}_2 \geqq 2$.

The surface of the toner image-receiving layer described herein means a surface of the electrophotographic image-receiving layer, where the toner image-receiving layer is applied.

The fixing belt used herein includes, for example, an endless belt made of a base material such as electroformed nickel, polyimide and polyphenylene sulfide (PPS). The surface of the fixing belt is coated with a fluorine or silicon containing polymer, i.e., a thin silicon or fluorine film is preferably applied on the surface of the fixing belt. The fixing belt includes, for example, a fluorine coating belt which is coated with a perfloroalkoxy alkane on a polyimide film, a silicon coating belt which is coated with a silicon denatured acrylic polymer on a polyimide film, and a belt which is coated with fluorine and silicon copolymers. The thickness of the coating layer is, for example, 10 to 60 $\mu$m, preferably 20 to 40 $\mu$m. By treating the surface, toner peeling or offset of a toner moiety can be prevented.

Other Electrophotographic Methods

The method for forming an image on the electrophotographic image-receiving sheet of the present invention is not particularly limited to the methods described above and shown in FIG. 2. Ordinary electrophotographic methods can be employed.

For example, a color image can be suitably formed on the electrophotographic image-receiving sheet of the present invention. The color image can be formed with an electrophotographic device capable of forming a full-colored image. An ordinary electrophotographic apparatus is composed of an image-receiving sheet sending part, a latent image-forming part and a developing part placed close to the latent image-forming part. In some devices, an intermediate toner image-transfer part is placed close to the latent image-forming part and the image-receiving sheet sending part at the center of the device.

For improving the image quality, an adhesion transfer method or a heat-support papering transfer method to be conducted in place of or in combination with the electrostatic transfer or bias roller transfer method is known. The structures of the transfer apparatus are described in, for example, J.P. KOKAI Nos. Sho 63-113,576 and Hei 5-341,666. The heat-supporting transfer method wherein an intermediate transfer belt is used is preferred particularly when a toner having a small particle diameter (not larger than 7 μm) is used.

The following Examples and Comparative Examples will further illustrate the present invention, but such Examples by no means limit the invention.

In the following Examples and Comparative Examples, percentages and parts are given by mass.

EXAMPLE

<Support A>

In a support, as stated in Table 1, a quality paper having a basis weight of 160 $g/m^2$ was used as a base layer, the polypropylene stated in Table 1 was applied to a toner image-receiving layer side of the base layer (surface side) in a thickness of 13 μm, the polyethylene stated in Table 1 was also applied to the other side of the base layer which has no toner image-receiving layer (back side) in a thickness of 15 μm to form a laminate layer. Then the laminate layer was subjected to a corona discharge. Then a mixture of gelatin (5 g) and water (1000 g) was applied to both surfaces of the laminate layer with a wire coater so that the weight of the coating after drying would be about 0.1 $g/m^2$ and then dried to obtain support A.

TABLE 1

| | Layer structure of support A | | Film thickness (μm) |
|---|---|---|---|
| Surface undercoating layer | Gelatin (5 g) + Water (1000 g) | 100 parts | 0.1 |
| Surface laminate layer (glossy) | High-density polyethylene (MI = 8 g/10 min, density 0.950) | 70 parts | 13 |
| | Low-density polyethylene (MI = 7 g/10 min, density 0.923) | 30 parts | |
| | Anatase-type titanium dioxide | 2.0 $g/m^2$ | |
| Pulp layer | Quality paper (basis weight of pulp tissue: 160 $g/m^2$) | | 151 |
| Back laminate layer (matte) | High-density polyethylene (MI = 8 g/10 min, density 0.950) | 70 parts | 15 |
| | Low-density polyethylene (MI = 7 g/10 min, density 0.923) | 30 parts | |
| Back undercoating layer | Gelatin (5 g) + Water (1000 g) | 100 parts | 0.1 |
| Total thickness | | | 179.2 |

<Composition for Forming a Toner Image-Receiving Layer>

A composition for forming a toner image-receiving layer shown in Table 2 was coated on the surface of the support A with a wire coater so that the weight of the coating after drying would be 8 $g/m^2$ and then dried to obtain the toner image-receiving layer.

TABLE 2

| | Mass (g) |
|---|---|
| Example 1 | |
| Polyester resin (TUFTONE U-5, Kao Corporation) | 400 g |
| Titanium dioxide (Typaque (registered trade name) A-220, Isihara Sangyo Kaisha, Ltd.) | 60 g |
| Triphenyl phosphate (Daihachi Kagaku) | 34.8 g |
| Metyl ethyl ketone | 800 g |
| Example 2 | |
| Water-dispersed polyester resin (KZA-7049, Unitika) | 100 g |
| Carnauba wax (Serozole 524, Chukyo Yushi) | 15 g |
| Titanium dioxide (Typaque (registered trade name) A-220, Isihara Sangyo Kaisha, Ltd.) | 0.9 g |
| Isopropyl alcohol | 30 g |
| Water | 10 g |
| Example 3 | |
| Polyester resin (Vylon 103, Toyobo Co., Ltd.) | 400 g |
| Titanium dioxide (Typaque (registered trade name) A-220, Isihara Sangyo Kaisha, Ltd.) | 60 g |
| Triphenyl phosphate (Daihachi Kagaku) | 34.8 g |
| Metyl ethyl ketone | 800 g |
| Example 4 | |
| Water-dispersed polyester resin (KZA-1449, Unitika) | 100 g |
| Carnauba wax (Serozole 524, Chukyo Yushi) | 15 g |
| Titanium dioxide (Typaque (registered trade name) A-220, Isihara Sangyo Kaisha, Ltd.) | 0.9 g |
| Isopropyl alcohol | 30 g |
| Water | 10 g |
| Comparative example 1 | |
| Water-dispersed polyester resin (Finetex ES-675, Dainippon Ink and Chemicals, Inc.) | 100 g |
| Carnauba wax (Serozole 524, Chukyo Yushi) | 15 g |
| Titanium dioxide (Typaque (registered trade name) A-220, Isihara Sangyo Kaisha, Ltd.) | 0.9 g |
| Isopropyl alcohol | 30 g |
| Water | 10 g |
| Comparative example 2 | |
| Water-dispersed polyester resin (KZA-1449, Unitika.) | 100 g |
| Carnauba wax (Serozole 524, Chukyo Yushi) | 15 g |
| Titanium dioxide (Typaque (registered trade name) A-220, Isihara Sangyo Kaisha, Ltd.) | 0.9 g |
| Isopropyl alcohol | 30 g |
| Water | 10 g |
| Fluoric surfactant (Surflon S-141, Seimi Chemical) | 20 g |

<Toner>

As a toner, a polyester resin toner having an average diameter of 6.5 μm (DC1250 developing agent) which was used for a color laser printer made by Fuji Xerox Co., Ltd. (DocuColor 1250 PF) was used (For more details, please see "Fuji Xerox technical report" No.13, 168 (2000), and J. P. KOKAI No. Hei 7-64327 and 11-65161).

| | | |
|---|---|---|
| Toner 1 | Cyan | Toner obtained by a pulverization method |
| Toner 2 | Black | Toner obtained by a pulverization method |
| Toner 3 | Yellow | Toner obtained by a pulverization method |
| Toner 4 | Magenta | Toner obtained by a pulverization method |

<Fixing Belt>

As a fixing belt, the following fixing belts 1 and 2 which were endless belts having polyimide as a base material and had the following coating applied thereon were used.

Fixing belt 1: Fluorine coating belt which is coated with a perfloroalkoxy alkane on a polyimide film in a thickness of 35 μm.

Fixing belt 2: Silicon coating belt which is coated with a silicon denatured acrylic polymer on a polyimide film in a thickness of 35 μm.

<Measurement of Surface Tension>

A surface tension of the polymers used in the toner image-receiving layers of the Examples and Comparative examples described in the above-mentioned paragraph "Composition for forming a toner image-receiving layer" and a surface tension of the Toner 1 were determined by the pendant drop method using PD-Z (with a temperature controlled bath) (Kyowa Interface Science Co. Ltd.). Concretely, the polymer or the toner was melted at the toner fixing temperature of 130° C., 150° C. and 180° C. to obtain a liquid form thereof, and a drop of the resultant was dropped from a needlepoint to enable a shape of the droplet to be analyzed. In this case, a density of the polymer and the toner is 1. The result is shown in Table 3. In Table 3, "Difference between the surface tensions" is calculated by the equation: (a surface tension of polymer used)−(a surface tension of a toner) (mN/m) at each toner fixing temperature.

<Evaluation>

The electrophotographic image-receiving sheets made by Example 1, 2 and Comparative example 1 were cut into an A4 size. White, gray (R, G and B for an image are all 50%), black and three kinds of women portrait images were used. The printer used was the same as a color laser printer (DocuColor 1250-PF) (Fuji Xerox Co., Ltd.) except that an electrophotographic device with an intermediate transfer belt system shown in FIG. 2 was used. By using this device, the portrait images were transferred to the image-receiving sheet, and the gloss and offset property were determined. Toner 1 mentioned above was used as a toner. A heating temperature of a heat roller (14) was controlled to be 130° C., 150° C. and 180° C.

(1) Gloss

Gloss for an image-receiving sheet was determined by the digital angle changeable light meter (UGV-5D, Suga Test Instruments Co. Ltd.), when an image was transferred at a toner fixing temperature of 150° C. As for the gloss, 45° gloss is measured based on JIS Z 8741. The higher the numerical value of the gloss is, the higher the gloss is.

(2) Offsetting and Peeling

Offsetting is the tendency for reverse transferring a portion of a toner or an image-receiving layer material to a fixing part. The offsetting was evaluated by observing a surface condition and a gloss of an image with the naked eye when the image was transferred at a toner fixing temperature of 150° C. Peeling was also evaluated by observing whether or not the portion of the toner or the material on the image receiving layer was peeled from the image-receiving layer. The test results were shown as ○ when the reverse transferring of the toner or the image-receiving layer material did not occur and there was no irregularity such as an uneven surface and peeling; and X when the reverse transferring of the toner or the image-receiving layer material occurred and irregularities such as an uneven surface be formed and the portion of the toner or the material being peeled from the image receiving layer.

The result is shown in Table 3.

TABLE 3

| | Example 1 | Example 2 | Comparative example 1 |
|---|---|---|---|
| Difference between the surface tensions (mN/m) (130° C.) | 8.3 | 8.4 | 11.3 |
| Difference between the surface tensions (mN/m) (150° C.) | 13.0 | 8.3 | 7.3 |
| Difference between the surface tensions (mN/m) (180° C.) | 11.2 | 8.7 | 6.6 |
| Gloss | 101.9 | 97.6 | 76.4 |
| Offsetting and peeling | ○ | ○ | X |

<Measurement of a Contact Angle>

A contact angle of the surface of the toner image-receiving layers and that of the surface of a fixing belt in the image-receiving sheets of the Examples and Comparative example were determined by using a contact angle meter of Kyowa Interface Science Co. Ltd. Toners 1 to 4 were placed on said surface of the toner image-receiving layer or the surface of the fixing belt, and the toners were melted at the toner fixing temperature of 130° C. and 180° C. to determine the contact angle. The image-receiving sheets shown in Examples 1, 3 and Comparative example 2 were used as an image-receiving sheet, and Fixing belt 1 was used as a fixing belt. The result is shown in Tables 4 and 5. In these tables, Difference between the contact angles was a value obtained by the equation: (a contact angle of the surface of the fixing belt)−(a contact angle of the surface of the toner image-receiving layer) (°) at each toner fixing temperature.<Evaluation>

The gloss and offset were determined by transferring an image to the image-receiving sheet prepared by the above-mentioned Examples and Comparative examples with a printer. Toner 1 was used as a toner. The heat temperature of the heat roller (14) was controlled so that the toner fixing temperature was 130° C. Methods for measuring the gloss and offset were the same as stated above except that the toner fixing temperature was 130° C. The result is shown in Tables 4 and 5.

TABLE 4

| | Example 1 | Example 3 | Comparative example 2 |
|---|---|---|---|
| Toner used | Toner 2 | Toner 2 | Toner 2 |
| Difference between the contact angles (°) (130° C.) | 34.1 | 38.8 | 8.9 |
| Gloss | 101.9 | 99.6 | 70.7 |
| Offset | ○ | ○ | X |

TABLE 5

| | Example 1 | Comparative example 3 | | |
|---|---|---|---|---|
| Toner used | Toner 1 | Toner 1 | Toner 3 | Toner 4 |
| Difference between the contact angles (130° C.) | 31.4 | 37.9 | 36.0 | 30.7 |
| Difference between the contact angles (180° C.) | 30.9 | 32.2 | — | — |
| Gloss | 101.9 | 99.6 | 99.6 | 99.6 |
| Offset | ○ | ○ | ○ | ○ |

<Measurement of Surface Free Energy>

A surface free energy of the toner image-receiving layers and that of the fixing belt in the image-receiving sheets of the Examples and Comparative example were determined by using a contact angle meter of Kyowa Interface Science Co. Ltd. First, water and methylene iodide were used as a probe solution. These liquids were placed on the surface of the toner image-receiving layer and the fixing belt as stated above to determine a contact angle at 25° C./55% RH. The obtained contact angle was incorporated in the above-mentioned Extended Fowkes equation to calculate a dispersion forces component ($g^d$) and polar forces component ($g^p$). In this connection, dispersion forces component and polar forces component were eigenvalues of the liquids, for example, which were used based on the value described in "Seni Gakkaishi (Journal of Fiber Society)" No. 38(4), T-147 (1982). From these obtained dispersion forces component ($g^d$) and polar forces component ($g^p$), and from the above-mentioned Extended Fowkes equation, a solid surface free energy (G) was calculated. The image-receiving sheets shown in Examples 1, 3 and 4, and Comparative example 2 were used as an image-receiving sheet, and Fixing belts 1 and 2 were used as a fixing belt. The result is shown in Tables 6 and 7. In these tables, Difference between the surface free energies was a value obtained by the equation: (a surface free energy of the surface of the toner image-receiving layer)−(a surface free energy of the surface of the fixing belt) (mN/m).

<Evaluation>

The gloss and offset were determined by transferring an image to the image-receiving sheet prepared by the above-mentioned Examples and Comparative examples using the electrophotographic device with an intermediate transfer belt system shown in FIG. 2. Toner 1 was used as a toner. The heat temperature of the heat roller (14) was controlled so that the toner fixing temperature was 130° C. Methods for measuring the gloss and offset were the same as stated above except that the toner fixing temperature was 130° C. The result is shown Tables 6 and 7.

TABLE 6

| | Example 1 | Example 3 | Example 4 | Comparative example 2 |
|---|---|---|---|---|
| Dispersion forces component ($g^d$) | 24.0 | 15.0 | 11.2 | 4.1 |
| Polar forces component ($g^p$) | 2.7 | 7.2 | 7.5 | 0.9 |
| Surface free energy (G) | 26.7 | 22.2 | 18.7 | 5.0 |
| Gloss | 101.9 | 99.6 | 98.4 | 70.7 |
| Offset | ○ | ○ | ○ | X |

(The fixing belt used: Fixing belt 1)

TABLE 7

| | Example 1 | Example 3 | Example 4 | Comparative example 2 |
|---|---|---|---|---|
| Dispersion forces component ($g^d$) | 23.2 | 14.2 | 10.4 | 3.3 |
| Polar forces component ($g^p$) | 0.3 | 4.8 | 5.1 | −1.5 |
| Surface free energy (G) | 23.6 | 19.1 | 15.6 | 1.9 |
| Gloss | 101.9 | 99.6 | 98.4 | 70.7 |
| Offset | ○ | ○ | ○ | X |

(The fixing belt used: Fixing belt 2)

Effect of the Present Invention:

By using the image-receiving sheet for electrophotography having the toner image-receiving layer of the present invention, a toner can be fixed on the toner image-receiving layer stably. Specifically, a portion of a toner image fixed on the toner image-receiving layer can not be reverse transferred onto a fixing part, i.e., offset can not occur, and thereby a stable image can be provided and a good toner image can be provided without decreasing the gloss. Furthermore, in respect of the relation between the toner image-receiving layer and the fixing belt, by controlling physical properties such as a contact angle and a surface free energy, peeling the image-receiving sheet and the fixing belt from each other can be improved, and paper jamming and paper feeding problems can be prevented, thereby permitting the electrophotographic device to be operated stably.

What is claimed is:

1. An image-receiving sheet for electrophotography, which comprises a toner image-receiving layer containing a polymer, wherein a relationship between a surface tension of said polymer ($\gamma_p$) (mN/m) determined at a toner fixing temperature and a surface tension of a toner ($\gamma_t$) (mN/m) determined at said toner fixing temperature meets the following formula (I);

$$\gamma_p - \gamma_t \geqq 8 \qquad \text{(I)}$$

2. The image-receiving sheet of claim 1 wherein said image-receiving sheet for electrophotography is used for an electrophotographic device having a fixing belt.

3. The image-receiving sheet of claim 1 wherein $\gamma_p$ and $\gamma_t$ meet the following formula: $\gamma_p - \gamma_t \geqq 9$.

4. The image-receiving sheet of claim 1 wherein said toner image-receiving layer contains a polyester resin.

5. The image-receiving sheet of claim 1 wherein said toner contains a polyester resin.

6. The image-receiving sheet of claim 1 wherein said toner fixing temperature is 100 to 180° C.

* * * * *